United States Patent
Ono et al.

(10) Patent No.: US 8,234,476 B2
(45) Date of Patent: Jul. 31, 2012

(54) INFORMATION PROCESSING APPARATUS AND METHOD OF UPDATING STACK POINTER

(75) Inventors: Rika Ono, Kanagawa (JP); Hitoshi Suzuki, Kanagawa (JP); Junichi Sato, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 372 days.

(21) Appl. No.: 12/314,073

(22) Filed: Dec. 3, 2008

(65) Prior Publication Data

US 2009/0172332 A1  Jul. 2, 2009

(30) Foreign Application Priority Data

Dec. 26, 2007 (JP) ................................. 2007-333386

(51) Int. Cl.
  G06F 12/00 (2006.01)
  G06F 13/00 (2006.01)
  G06F 13/28 (2006.01)
  G06F 15/00 (2006.01)
  G06F 9/30 (2006.01)
  G06F 9/40 (2006.01)

(52) U.S. Cl. .................... 711/163; 711/132; 712/202

(58) Field of Classification Search ............ 711/163, 711/132; 712/202

See application file for complete search history.

(56) References Cited

U.S. PATENT DOCUMENTS

| 6,654,871 | B1 * | 11/2003 | Aidan et al. | 712/202 |
| 6,826,675 | B1 * | 11/2004 | Tormey et al. | 712/202 |
| 2007/0266214 | A1 * | 11/2007 | Ohyama | 711/163 |
| 2008/0263315 | A1 * | 10/2008 | Zhang et al. | 711/208 |

FOREIGN PATENT DOCUMENTS

| JP | 61-75446 | 4/1986 |
| JP | 2000-020352 | 1/2000 |
| JP | 2000-155677 | 6/2000 |

* cited by examiner

*Primary Examiner* — Yaima Campos

(74) *Attorney, Agent, or Firm* — McGinn IP Law Group, PLLC

(57) ABSTRACT

A instruction execution part of an information processing device outputs an access request including a first address information to specify an access destination based on an execution of an access command of an address space in a memory. The instruction execution part also outputs a check request including a second address information to specify a stack pointer point after extension based on an execution of a stack extension command to extend a stack included in the address space in the memory by updating a stack pointer. A protection violation detection section of the information processing device detects whether the access destination includes the plurality of the partial spaces by collating the first information with the memory protection information stored in the memory protection information storage section.

15 Claims, 13 Drawing Sheets

INFORMATION PROCESSING APPARATUS AND METHOD OF UPDATING STACK POINTER

BACKGROUND

1. Field of the Invention

The present invention relates to an information processing apparatus including a memory protecting function.

2. Description of Related Art

A technology for protecting a memory from unauthorized memory access, that is, so-called "memory protection technology" has been known. According to the conventionally-known memory protection technology, when an instruction executing section that executes a program, such as a central processing unit (CPU), accesses a memory, the validity of an access request is verified by comparing and collating access destination address information, which is included in a memory access request output from the instruction executing section, with memory protection information indicative of an access-permitted memory area. Thus, unauthorized memory access to an access-inhibited memory area can be detected, thereby making it possible to protect a memory from unauthorized memory access.

Japanese Unexamined Patent Application Publication No. 61-75446 (Kimura et al.) discloses an address comparison system for memory protection in an information processing apparatus. Specifically, in the address comparison system disclosed in Kimura et al., it is determined whether or not an address of an access destination of a program falls within a range of access-permitted partial memory spaces (falls within access permission range) by comparing a lower bound address and an upper bound address, which fall within the access permission range, with the access destination address. Then, the access to the partial memory space is permitted only when the access destination address falls within the access permission range.

However, the conventional memory protection technology is not enough to prevent destruction of memory data due to an unauthorized stack operation when a part of a memory is used as a stack. The conventional memory protection technology has a first problem in that, when a memory area that can be accessed as a stack (hereinafter, referred to as "stack area") and an accessible memory area used except for a stack are adjacent to each other, the memory access made by a stack operation instruction is permitted even if the memory access specifies a non-stack area, which may cause destruction of data stored outside the stack.

For example, when it is assumed that a stack overflow is detected using the conventional protection technology, the determination is made after the memory access request is output. In other words, after the instruction executing section executes a stack operation (push operation or pop operation) by executing a single instruction or a plurality of instruction sequences, a stack overflow is detected at the time when the access from the instruction executing section to the outside of the stack area is generated. That is, the conventional memory protection technology has a second problem in that it is difficult to detect the stack overflow before the execution of the stack operation instruction.

Japanese Unexamined Patent Application Publication No. 2000-155677 (Sugano) discloses a technology in which a redundant buffer area for detecting a stack overflow is provided between a stack area and an area used except for the stack area. According to the technology disclosed in Sugano, the stack area is spaced apart from the memory area used except for the stack area, thereby making it possible to solve the first problem. In terms of memory space efficiency, however, the technology disclosed in Sugano is not desirable. In addition, the technology disclosed in Sugano is similar to the conventional memory protection technology in that the stack overflow is detected after the stack operation instruction is executed. The technology disclosed in Sugano has a problem in that, for example, debugging for specifying the cause of the generation of the stack overflow cannot be effectively performed.

Japanese Unexamined Patent Application Publication No. 2000-20352 (Toride) discloses a technology in which, in the case of calling a function (including a procedure and a subprogram), for example, a value of a stack pointer register for holding a stack pointer is compared with an overflow detection address when stack extension is performed by updating the value of the stack pointer. FIG. 13 is an explanatory diagram disclosed in Toride. A comparator 83 compares the stack pointer value stored in a stack pointer register (SPR) 82, with the overflow detection address stored in a stack overflow register 81, thereby detecting that the stack is extended over the stack area. Thus, according to the technology disclosed in Toride, the generation of the stack overflow can be predictively detected before the execution of the stack operation instruction.

SUMMARY

In the technology disclosed in Toride, however, the stack overflow detection address is held in the stack overflow register 81 provided for detecting the stack overflow. As a result, there arises a problem in that the hardware configuration is redundant.

A first exemplary aspect of an embodiment of the present invention is an information processing device includes a instruction execution part, a memory protection information storage section, a protection violation detection section, and a checking section. The instruction execution part outputs an access request including a first address information to specify an access destination based on an execution of an access command of an address space in a memory. The instruction execution part outputs a check request including a second address information to specify a stack pointer point after extension based on an execution of a stack extension command to extend a stack included in the address space by updating a stack pointer.

The memory protection information storage section stores a memory protection information to define a plurality of partial spaces from the address space, the partial space can access by the instruction executing part.

The protection violation detection section detects whether the access destination includes the plurality of the partial spaces by collating the first information with the memory protection information stored in the memory protection information storage section.

The checking section checks whether the stack pointer point includes a predetermined partial space among the plurality of the partial spaces by collating the second address information with the memory protection information stored in the memory protection information storage unit, the predetermined partial space is retained preliminarily as a stack area enabling the stack.

A second exemplary aspect of an embodiment of the present invention is a method for updating a stack pointer of an information processing device including an instruction executing part and a memory protection information storage section storing a memory protection information to specify a plurality of partial spaces which enable an access by the instruction executing part from an address pace. The method includes the following steps (a)-(d).

(a) Outputting an access request including a first address information to specify an access destination by the in the instruction executing part corresponding to the execution of an access request to the address space.

(b) Detecting whether the access destination is included in the plurality of the partial spaces by collating the first address information with the memory protection information stored in the memory protection information storage section.

(c) Outputting a check request including a second address information to specify a stack pointer point after extension corresponding to an execution of a stack extension request to extend a stack included in the address space by updating a stack pointer.

(d) Checking whether the stack pointer point is included a predetermined partial space among the plurality of the partial spaces by collating the second address information with the memory protection information stored in the memory protection information storage unit, the predetermined partial space being retained preliminarily as a stack area enabling the stack.

According to the first and second aspects of the present invention, the memory protection information, which is used for detecting unauthorized memory access and is stored in the memory protection information storage section, is also used for confirming whether the stack extension is proper or not. Accordingly, it is not necessary to independently provide a storage section that holds address information for specifying the address range of the stack area, which is required for confirming whether the stack extension is proper or not.

According to the present invention, the address information used for confirming whether the stack extension is proper or not is also used as the address information used for the memory protection implemented by detecting the unauthorized memory access and is stored in the common storage section, thereby enabling a reduction of redundant hardware required for confirming whether the stack extension is proper or not.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
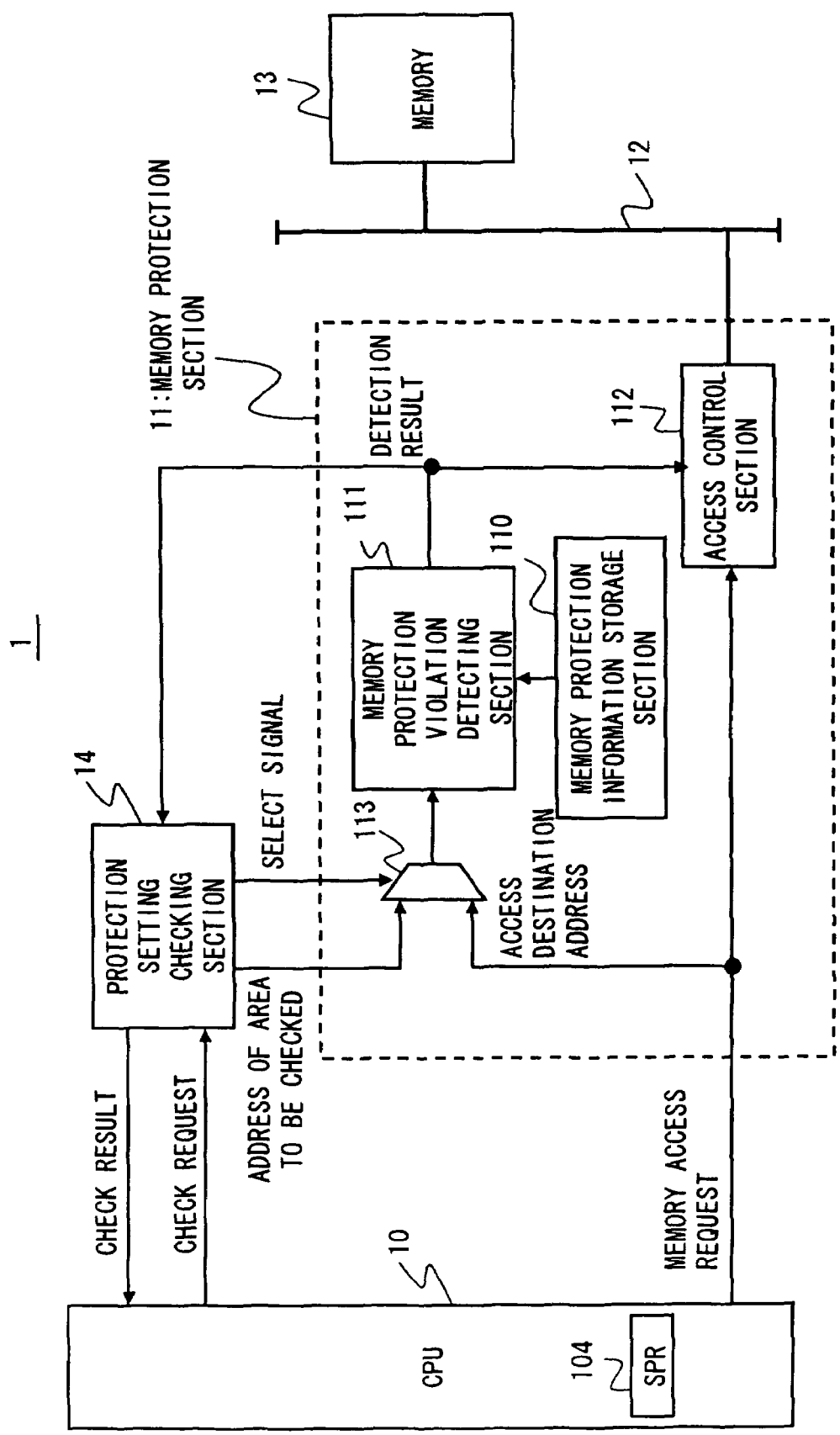
FIG. 1 is a block diagram showing the configuration of an information processing apparatus according to a first exemplary embodiment of the present invention.

Hereinafter, exemplary embodiments of the present invention will be described in detail with reference to the accompanying drawings. The same components are denoted by the same reference numerals throughout the drawings, and a redundant description thereof is omitted as appropriate for clarification of the explanation.

According to the following exemplary embodiments of the present invention, the term "central processing unit (CPU)" refers to a processing unit having an instruction fetch function, an instruction decode function, and an instruction execution function.

First Exemplary Embodiment

An information processing apparatus 1 according to an exemplary embodiment of the present invention has a memory protection function. Additionally, the information processing apparatus 1 has the following function. That is, the information processing apparatus 1 predictively detects the generation of a stack overflow due to execution of a called function, when stack extension, that is, update of a stack pointer is carried out upon a function call, for example, by using hardware for implementing the memory protection function.

FIG. 1 is a block diagram showing the configuration of a main part of the information processing apparatus 1. Referring to FIG. 1, a CPU 10 reads an instruction from a memory 13 and decodes the read instruction. Then, the CPU 10 executes processing corresponding to the decoded information, for example, arithmetic processing such as an arithmetic operation and a logical operation, and read access and write access to the memory 13. Further, the CPU 10 according to an exemplary embodiment of the present invention verifies the validity of the execution of a calling program from the standpoint of memory protection, when switching of execution programs is executed in response to a program call such as a function call or a subprogram call. For this reason, the CPU 10 outputs an address of a memory area, which is to be accessed by the calling program (hereinafter, referred to as "area to be checked"), to a protection setting checking section 14 described later, prior to execution of a called program.

The area to be checked according to an exemplary embodiment of the present invention includes a stack area (memory area allocated for use as a stack) which is allocated in advance to a task including a calling function and a called function, and also includes a memory area which is newly allocated to the called function when the stack extension is performed. In this case, the term "task" refers to a unit of programs that can be executed in parallel in a multi-task environment. The multi-task environment is realized by the CPU 10 and an operating system program (OS) that manages the scheduling of tasks executed by the CPU 10.

A memory protection section 11 receives an access request for accessing the memory 13, from the CPU 10. The access request supplied from the CPU 10 includes a read/write type and an access destination address (a first address information), and further includes write data when the access type is write access. The access destination address can be specified in various formats. For example, the access destination address may be specified by a single address so as to specify an access destination in units of one word. Alternatively, to specify the access destination in units of a plurality of words, the address destination may be specified by, for example, a combination of a base address and the size of data required to be transferred, or a combination of a lower bound address and an upper bound address of a location where the data required to be transferred is stored.

Memory protection information stored in a memory protection information storage section 110 is set according to the task executed by the CPU 10, and the contents of the memory protection information are updated so as to correspond to the task of the switching destination, upon switching of the task executed by the CPU 10. The memory protection information storage section 110 is updated such that the contents of the memory protection information are updated with the set contents corresponding to the task of the switching destination, according to a system program that is activated at the time of switching the task executed by the CPU 10, for example.

Setting of an access-permitted memory area (a partial space) in the memory protection information can be made in various formats, as in the case of the access destination address. Therefore the memory protection information includes a plurality of address range specified information to set the memory area. For example, setting of the memory area in the memory protection information may be made using a combination of a lower bound address and an upper bound address of the memory area, or a combination of a starting address (lower bound address or upper bound address) of the memory area and an area size. Alternatively, by specifying the starting address of the memory area and the number of low-order bits to be masked, a power-of-two sized memory area may be specified using the starting address. In other words, the method of specifying the memory area to be protected is not particularly limited.

Furthermore, the memory protection information stored in the memory protection information storage section 110 holds stack reference permission information (stack identification information) indicating whether or not each of a plurality of access-permitted areas (partial spaces) corresponds to a stack area, that is, indicating whether or not each of the plurality of access-permitted areas can be referenced as a stack.

A memory protection violation detecting section 111 included in the memory protection section 11 compares a destination address of the access requested by the CPU 10, with the memory protection information set in the memory protection information storage section 110, and detects whether or not the access destination address contained in the memory access request is included in the access-permitted memory area.

An access control section 112 controls whether or not to permit the access to the memory 13 based on the memory access request according to a detection result of the memory protection violation detecting section 111. Specifically, when the memory protection violation detecting section 111 detects that the access destination address is included in an access-permitted memory area, the access control section 112 permits the memory access. On the other hand, when the memory protection violation detecting section 111 detects that the access destination address is included in an access-inhibited memory area, the access control section 112 inhibits the memory access. Note that, when the memory protection violation detecting section 111 or the access control section 112 detects the access to the access-inhibited memory area, a signal indicating that unauthorized access is detected may be output to the CPU 10.

A selector 113 switches address information, which is input to the memory protection violation detecting section 111 and which is compared with the memory protection information, between the access destination address contained in the memory access request received from the CPU 10, and the address of the area to be checked, which is contained in a check request described later. Operations of the selector 113 according to an exemplary embodiment of the present invention are controlled by a protection setting checking section 14 described later.

The memory 13 is connected to the memory protection section 11 through a memory bus 12. The memory 13 is used as an area for storing a system program and an application program, which are read and executed by the CPU 10, and is also used as an area for storing data used by the system program and the application program, for example. That is, the memory 13 is formed of a RAM, a ROM, a flash memory, or the like, or a combination thereof. Further, the memory bus 12 is a general term for an address bus and a data bus.

The protection setting checking section 14 receives the check request including the address of the area to be checked, from the CPU 10, and checks whether the address of the area to be checked is included in the stack area. Then, the protection setting checking section 14 supplies a check result to the CPU 10. More specifically, in order to detect the violation of the access request, the protection setting checking section 14 uses the memory protection information, which is already set in the memory protection information storage section 110, as it is, and compares the memory protection information with the address of the area to be checked. Then, the protection setting checking section 14 checks whether the address of the area to be checked is included in the memory area which is permitted to be referenced as a stack by the stack reference permission information, that is, the stack area.

Further, in the configuration of FIG. 1 according to an exemplary embodiment of the present invention, hardware for comparing and collating the address of the area to be checked, with the memory protection information is used also as hardware for comparing and collating the access destination address included in the memory protection violation detecting section 111, with the memory protection information.

Incidentally, the protection setting checking section 14 according to an exemplary embodiment of the present invention is capable of performing a wide-range check, that is, capable of checking not only whether or not the area corresponds to the stack area, but also whether or not the address of the area to be checked is compatible with a memory protection setting for a calling task. For example, in the case of switching execution programs from a program A to a program B when the program A calls the program B, it is preferable to output the check request for setting the memory area, which is to be indirectly accessed by the calling program A through the calling program B, as the area to be checked. En response to the check request, the protection setting checking section 14 can check whether the check request is compatible with the memory protection setting for the program A, based on the memory protection information set in the memory protection information storage section 110 so as to detect the violation of the access request from the program A. Note that the technology in which the access right of the calling program A is checked and the execution of the called program B is started only when the validity of the access right is confirmed, is described in detail in a prior application filed by the same inventors and applicant as those of the subject application (Japanese Patent Application No. 2007-306821 filed on Nov. 28, 2007), which is hereby incorporated by reference.

Note that the configuration shown in FIG. 1 is merely an example. Though it is assumed that the memory protection section 11 accesses the memory bus 12 in the above-mentioned configuration, the access to the memory bus 12 and the memory 13 may be made by other devices such as a memory controller (not shown), for example. Further, at least a part of a physical transmission path for the check request and a physical transmission path for the access request may be shared. Though FIG. 1 illustrates the selector 113 included in the memory protection section 11, the actual hardware configuration of the information processing apparatus 1 is not limited thereto. That is, the selector 113 shown in FIG. 1 may be disposed at a pre-stage of the memory protection violation detecting section 111 so that the access destination address, which is contained in the memory access request, or the address of the area to be checked, which is contained in the check request, can be selectively supplied to the memory protection violation detecting section 111.

Figure 2:
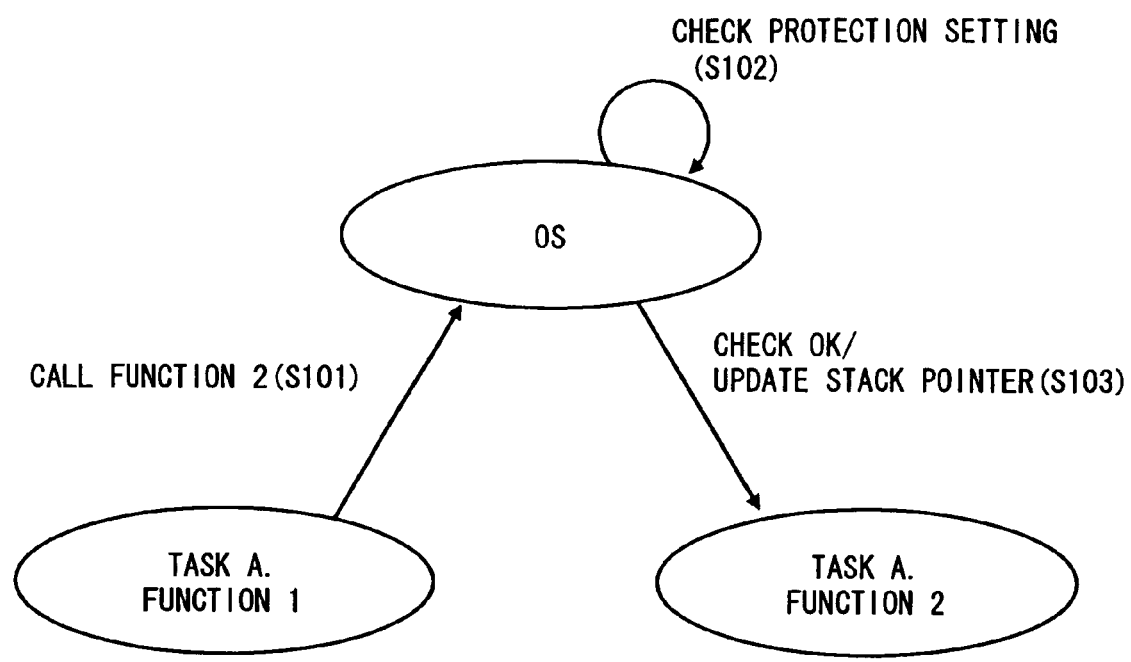
FIG. 2 is a diagram showing a configuration example of a memory protection violation detecting section.

Next, the configuration and operations of each component of the information processing apparatus 1 shown in FIG. 1 are described in detail below. FIG. 2 is a conceptual diagram for explaining the operation performed when the CPU 10 calls a function. While the CPU 10 executes a function 1 included in a task A, when another function 2 is called, the processing shifts to the OS that performs execution program switching processing including function call processing (S101).

In the function call processing carried out by the OS, a stack extension instruction for extending the stack by updating the stack pointer so as to secure the stack for the function 2, which needs to be provided to save a register storage value at the time of executing the function 1, for example. Then, the CPU 10 issues the check request to the protection setting checking section 14 before updating a stack pointer register 104 upon execution of the stack extension instruction (S102). In this case, the check request includes address information for specifying a stack pointer value obtained after the stack is extended, as the address of the area to be checked. Specifically, for example, a current stack pointer value stored in the stack pointer register 104, and the size of the stack to be extended for the function 2 may be used as the address of the area to be checked. Further, when the stack is extended in a direction in which the address decreases, the stack pointer value to be updated, which is obtained by subtracting the size of the stack to be extended for the function 2, from the current stack pointer value, may also be used as the address of the area to be checked.

Upon confirming that the address of the area to be checked is included in the stack area based on the check result supplied from the protection setting checking section 14 to the CPU 10, the OS overwrites the stack pointer register 104 with the stack pointer value obtained after the stack extension, and activates the called function 2 (S103).

Figures 3A, 3B:
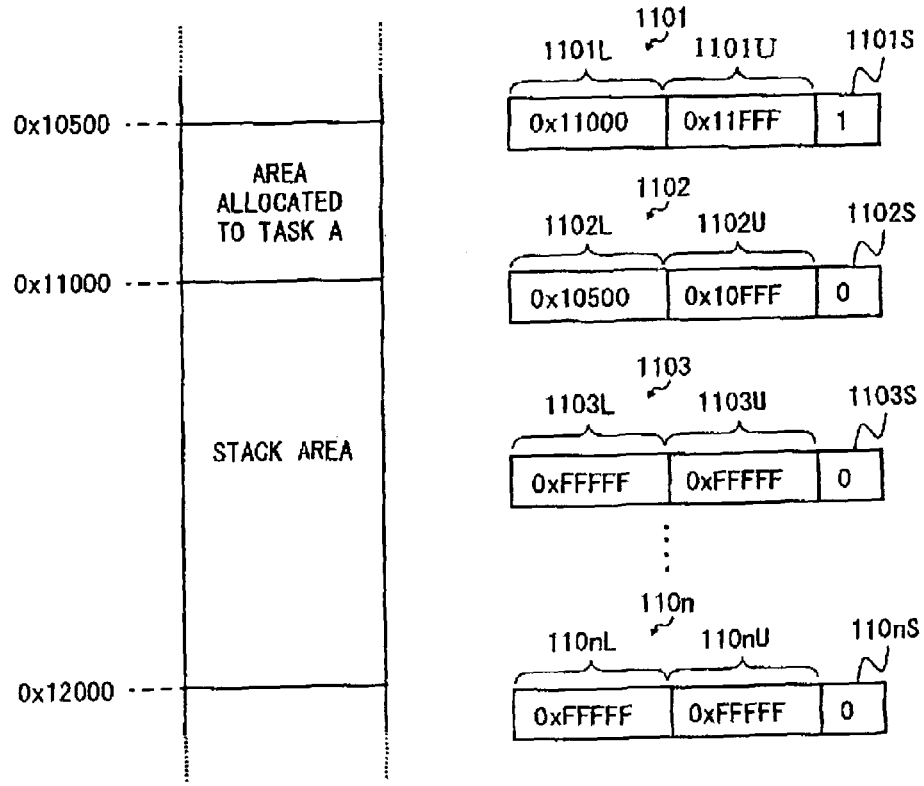
FIGS. 3A and 3B are diagrams each showing a configuration example of a protection setting checking section.

FIG. 3A shows an example of a memory map of the memory 13. FIG. 3A is a memory map showing an example of an access-permitted area for the task A. In the example shown in FIG. 3A, the task A is permitted to access two partial address spaces having addresses 10500 to 10FFF and addresses 11000 to 11FFF, respectively. Of the two partial address spaces, the space having the addresses 11000 to 11FFF is secured as a stack area.

FIG. 3B is a diagram showing a specific configuration example of the memory protection information storage section 110. FIG. 3B shows the set contents corresponding to the access-permitted area of the task A shown in FIG. 3A. In the example shown in FIG. 3B, the memory protection information storage section 110 includes n number of protection setting registers 1101 to 110*n*. Each of the protection setting registers specifies a single access-permitted area. Further, each of the protection setting registers 1101 to 110*n* specifies the access-permitted area by using a lower bound address and an upper bound address. For example, the protection setting register 1101 shown in FIG. 3B is a register holding the settings corresponding to the access-permitted areas having the addresses of 11000 to 11FFF shown in FIG. 3A, respectively. Thus, the address 11000 is assigned to a lower-bound address assignment section 1101L, and the address 11FFF is assigned to an upper-bound address assignment section 1101U. Similarly, the protection setting register 1102 shown in FIG. 3B holds the settings corresponding to the access-permitted areas having the addresses 10500 to 10FFF shown in FIG. 3A, respectively.

As in the case of the protection setting registers 1103 to 110*n* of FIG. 3B, for example, an invalid value (for example, "FFFFF") may be written, as the upper bound address and the lower bound address, into the registers that are not used for setting the access-permitted areas, to thereby indicate that the setting is invalid. Further, a storage area for holding a flag indicating the validity/invalidity of each of the protection setting registers 1101 to 110*n* may be separately provided.

Furthermore, as shown in FIG. 3B, the protection setting registers 1101 to 10*n* respectively include stack reference assignment sections 1101S to 110*n*S. Each of the stack reference assignment sections 1101S to 110*n*S indicates that a partial address space specified by each of the protection setting registers, that is, a memory area corresponds to the stack area that can be referenced as a stack. Thus, in the example shown in FIG. 3B, a value "1" indicating the memory area corresponds to a stack area is set to the stack reference assignment section 1101S of the protection setting register 1101 that specifies the access-permitted area corresponding to the stack area. On the other hand, a value "0" indicating that the memory area corresponds to a non-stack area is set to the stack reference assignment section 1102S of the protection setting register 1102 that specifies the access-permitted area corresponding to the non-stack area.

Figure 4:
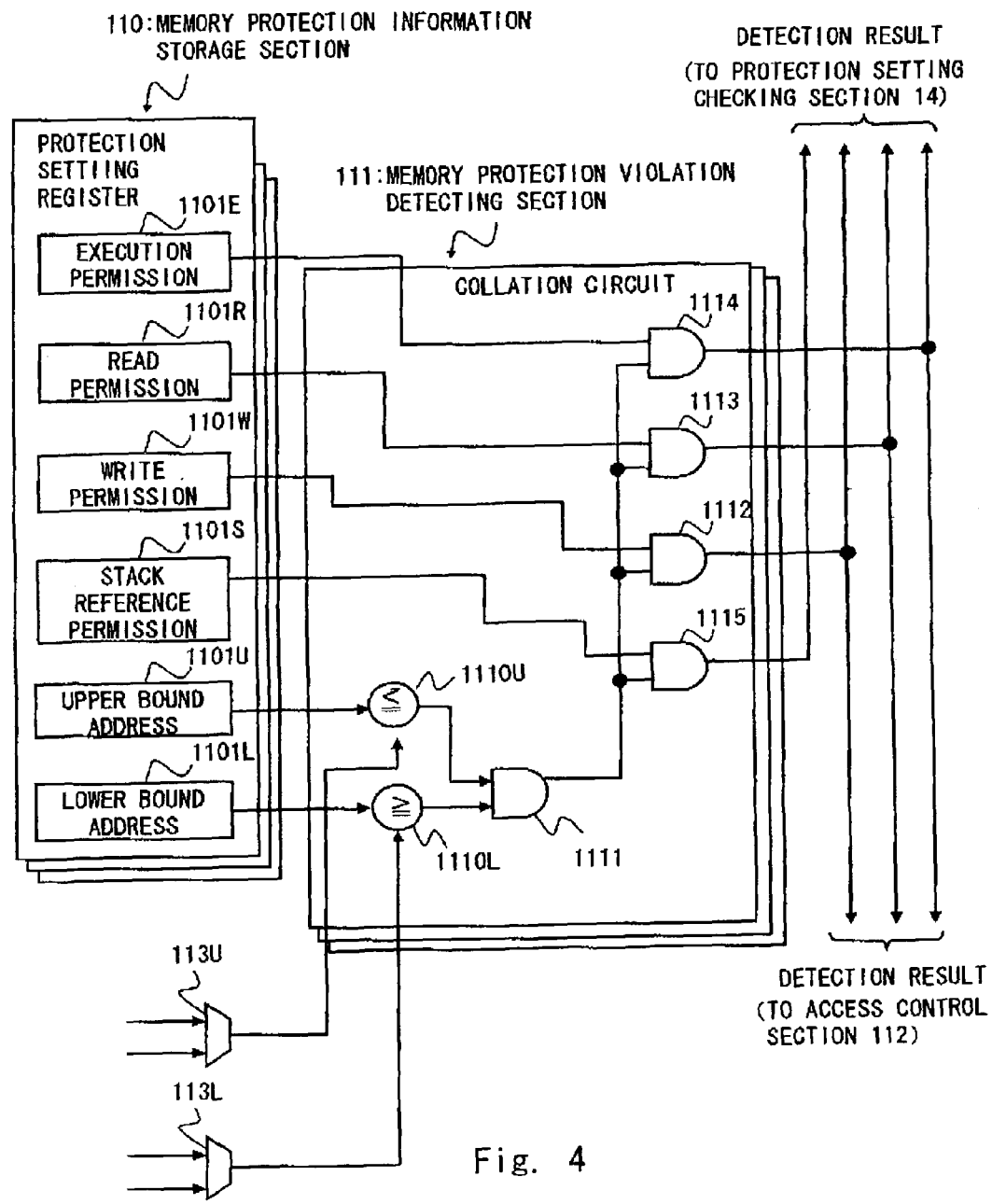
FIG. 4 is a state transition diagram showing states of the protection setting checking section.

Next, referring to FIG. 4, a configuration example of the memory protection violation detecting section 111 is described. As in the specific example shown in FIG. 3B, the memory protection information storage section 110 shown in FIG. 4 is formed as an assembly of a plurality of protection setting registers. Note that each of the protection setting registers shown in FIG. 4 specifies not only the upper bound address and the lower bound address of an access-permitted area, but also a permission type of the access-permitted area. Specific examples of the permission type include write access, read access, and instruction fetch access. A write permission assignment section 1101W indicates write access permission when the value is "1", and indicates write access denial when the value is "0". Similarly, a read permission assignment section 1101R indicates read access permission when the value is "1", and indicates read access denial when the value is "0". Furthermore, an execution permission assignment section 1101E indicates instruction fetch access permission when the value is "1", and indicates instruction fetch access denial when the value is "0".

Selectors 113U and 113L shown in FIG. 4 are included in the selector 113 shown in FIG. 1. The selector 113U selectively supplies the access destination of the CPU 10 or the upper bound address of the area to be checked, to the memory protection violation detecting section 111. The selector 113L selectively supplies the access destination of the CPU 10 or the lower bound address of the area to be checked, to the memory protection violation detecting section 111.

Further, the memory protection violation detecting section 111 shown in FIG. 4 is formed as an assembly of as many collation circuits as the protection setting registers. Each of the collation circuits shown in FIG. 5 includes comparator circuits 1110U and 1110L and AND circuits 1111 to 1115. Each of the AND circuits 1111 to 1115 outputs a logical product of two input values.

The comparator circuit 1110U compares a value held in the upper-bound address assignment section 1101U of the protection setting register, with an address supplied from the selector 113U. The comparator circuit 1110U outputs the value "1" as a true value when the address supplied from the selector 113U is equal to or smaller than the upper bound address held in the upper-bound address assignment section 1101U, and outputs the value "0" as a false value when the address supplied from the selector 113U exceeds the upper bound address held in the upper-bound address assignment section 1101U.

The comparator circuit 1110L compares a value held in the lower-bound address assignment section 1101L of the protection setting register, with an address supplied from the selector 113L. The comparator circuit 1110L outputs the value "1" as a true value when the address supplied from the selector 113L is equal to or larger than the lower bound address held in the lower-bound address assignment section 1101L, and outputs the value "0" as a false value when the address supplied from the selector 113L is smaller than the lower bound address held in the lower-bound address assignment section 1101L.

The AND circuit 1111 outputs the true value "1" when both the comparator circuits 1110U and 1110L output the true value, that is, when the memory area specified by two pieces of address information supplied from the selectors 113U and 113L is included in the access-permitted area.

Further, the AND circuit 1112 outputs the true value "1" when the memory area specified by two pieces of address information supplied from the selectors 113U and 113L is included in the access-permitted area and when the write access is permitted.

Similarly, the AND circuit 1113 outputs the true value "1" when the memory area specified by two pieces of address information supplied from the selectors 113U and 113L is included in the access-permitted area and when the read access is permitted. Further, the AND circuit 1114 outputs the true value "1" when the memory area specified by two pieces of address information supplied from the selectors 113U and 113L is included in the access-permitted area and when the instruction fetch access is permitted.

Furthermore, the AND circuit 1115 outputs the true value "1" when the memory area specified by two pieces of address information supplied from the selectors 113U and 113L is included in the access-permitted area and when the stack reference is permitted.

The detection results of the memory protection violation detecting section 111, which indicate the permission/denial of write access, the permission/denial of read access, the permission/denial of instruction fetch access, and the permission/denial of stack reference, are supplied to the access control section 112 and the protection setting checking section 14. Note that, according to an exemplary embodiment of the present invention, the detection result as to the permission/denial of stack reference is not used by the access control section 112 for controlling the access permission/denial. Accordingly, it is not necessary to supply the determination result as to the permission/denial of stack reference, to the access control section 112.

Figure 5:
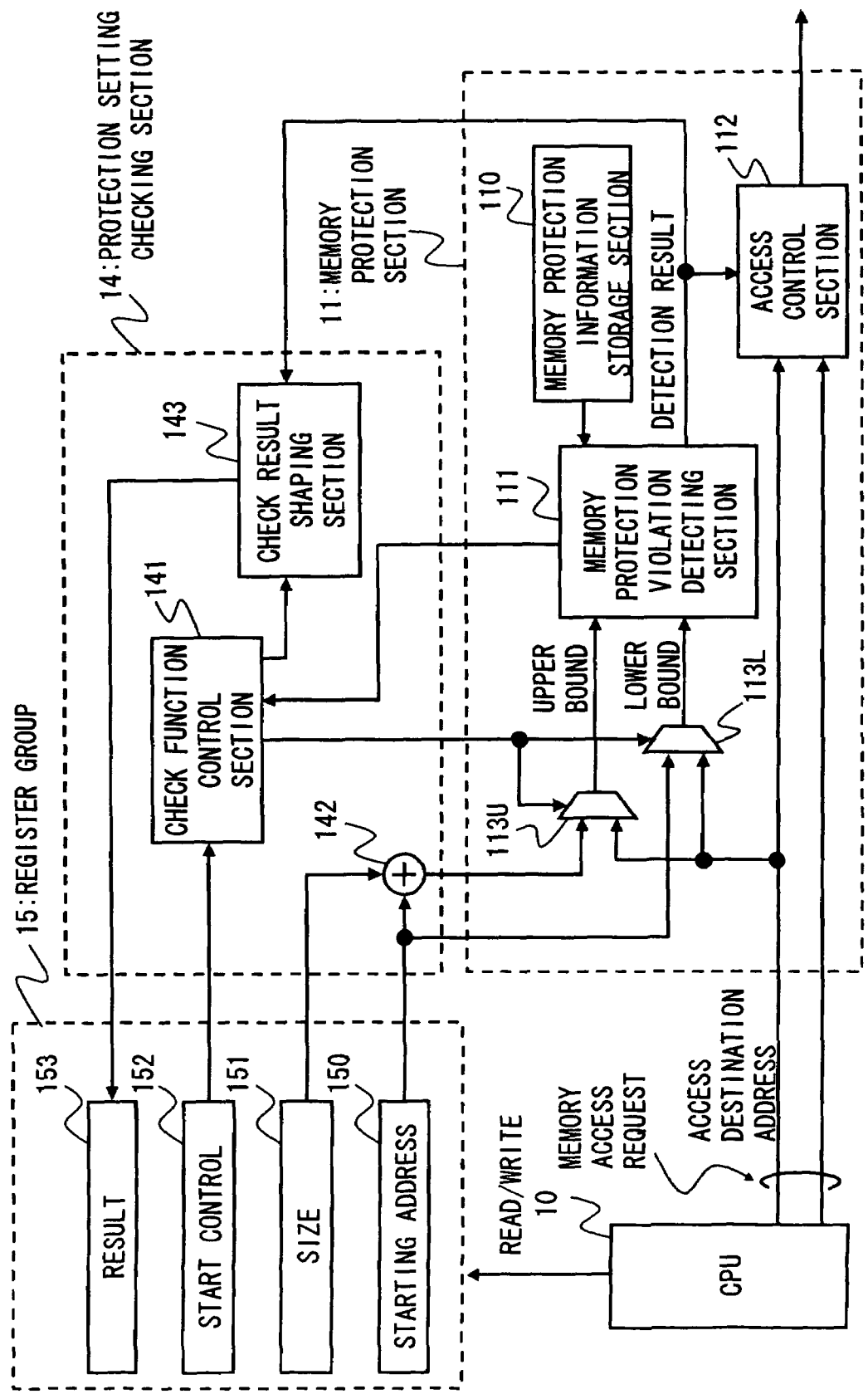
FIG. 5 is a diagram showing another configuration example of the protection setting checking section.

Note that the example of FIG. 5 shows the configuration in which the detection results as to the permission/denial of write access, the permission/denial of read access, the permission/denial of instruction fetch access, and the permission/denial of stack reference are individually output from the memory protection violation detecting section 111. As a matter of course, the configuration is merely an example. For example, the memory protection violation detecting section 111 may detect the violation regarding a more specific access type. Further, the memory protection violation detecting section 111 may detect only whether or not the area corresponds to an access-permitted area, or whether or not the area corresponds to a stack area.

Next, referring to FIGS. 5 to 7, a configuration example and operations of the protection setting checking section 14 are described below. Also, a specific example for transferring data on the check request and the check result, between the CPU 10 and the protection setting checking section 14 is described below.

FIG. 5 shows a specific configuration example of each of the memory protection section 11 and the protection setting checking section 14, which are shown in FIG. 1, and also shows a register group 15 for use in transferring data between the CPU 10 and the protection setting checking section 14.

As for the memory protection section 11, FIG. 5 shows the selectors 113U and 113L included in the selector 113. The input/output and operations of the selectors 113U and 113L are as described above.

The protection setting checking section 14 shown in FIG. 5 includes a check function control section 141, an adder circuit 142, and a check result shaping section 143. The check function control section 141 controls processing for checking the address of the area to be checked, according to the check request from the CPU 10.

Figure 6:
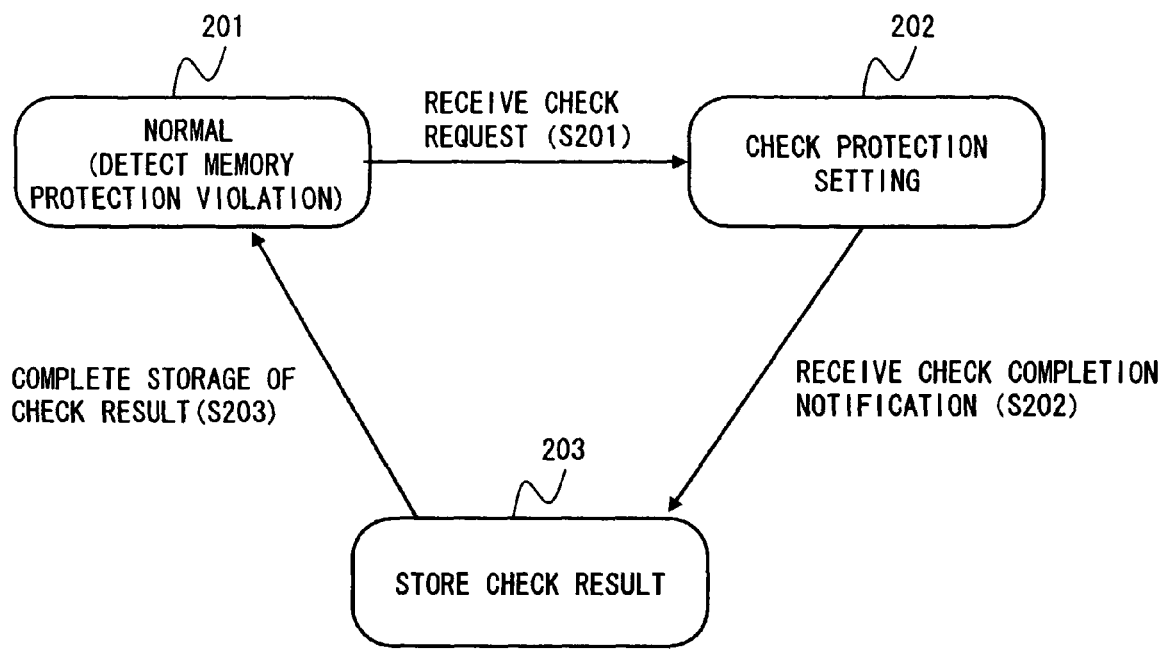
FIG. 6 is a conceptual diagram for explaining a function call operation performed in the information processing apparatus according to the first exemplary embodiment of the present invention.

FIG. 6 is a transition diagram showing the operation states of the check function control section 141. In a normal state 201, that is, in a state where the check function control section 141 has not received the check request from the CPU 10, the check function control section 141 controls selectors 131U and 131L such that the access destination address included in the memory access request is supplied to the memory protection violation detecting section 111.

Upon receiving the check request from the CPU 10, the check function control section 141 makes a transition to a protection setting check state 202 (S201 of FIG. 6). In the protection setting check state 202, the check function control section 141 controls the selectors 131U and 131L such that the address of the area to be checked, which is a target of the check request, is supplied to the memory protection violation detecting section 111. According to this control, the memory protection violation detecting section 111 executes processing for the address of the area to be checked in a similar manner as that for the access destination address, and outputs the detection result.

In the example shown in FIG. 5, the address information about the area to be checked included in the check request indicates the starting address of the area to be checked and the size of the area to be checked. Thus, in the example shown in FIG. 5, the adder circuit 142 adds the starting address of the area to be checked to the size of the area to be checked, thereby generating the upper bound address of the area to be checked and supplying the generated upper bound address to the selector 131U.

After the completion of detection by the memory protection violation detecting section 111, the check function control section 141 makes a transition to a check result storage state 203. For example, when the memory protection violation detecting section 111 completes the detection, the memory protection violation detecting section 111 may be caused to output a termination notification to the check function control section 141, and the check function control section 141 may make a transition to the check result storage state, upon reception of the termination notification (S202 of FIG. 6). Alternatively, the check function control section 141 may make a transition to the check result storage state 203 after the predetermined elapsed time without receiving the explicit termination notification. In the check result storage state 203, the check result shaping section 143 receives the detection results of the memory protection violation detecting section 111, and aggregates and selects the detection results, for example, and shapes them into an appropriate predetermined data format. Then, the check result shaping section 143 outputs the check results thus shaped, to a storage area that can be referenced by the CPU 10. After the completion of output of the check results, the check function control section 141 returns to the normal state 201 (S203 of FIG. 6).

In the example shown in FIG. 6, four registers included in the register group 15 are used for transferring the data on the check request and the check result between the CPU 10 and the protection setting checking section 14. A starting address register 150 is a register which stores the starting address of the area to be checked and which is written by the CPU 10 and read by the protection setting checking section 14. A size register 151 is a register which stores the size of the area to be checked and which is written by the CPU 10 and read by the protection setting checking section 14. A start control register 152 is a register which is written by the CPU 10 so as to cause the protection setting checking section 14 to start checking. The protection setting checking section 14 makes a transition to the protection setting check state 202 in response to the writing of data indicative of the start of checking, into the start control register 152, and starts processing of checking the address of the area to be checked. Lastly, a result register 153 is a register into which the check results shaped by the check result shaping section 143 are written. The CPU 10 shown in FIG. 5 obtains the check results from the protection setting checking section 14 through the result register 153.

Note that the configuration shown in FIG. 5 is merely an example of the specific configuration of the information processing apparatus 1 according to an exemplary embodiment of the present invention. For example, FIG. 5 shows the configuration example in which the protection setting checking section 14 starts the check processing in response to the writing of data into the start control register 152 by the CPU 10. Instead of the configuration, it is possible to employ a configuration in which the protection setting checking section 14 receives a dedicated instruction or a dedicated command supplied from the CPU 10 to execute the check processing according to the instruction or command.

Figure 7:
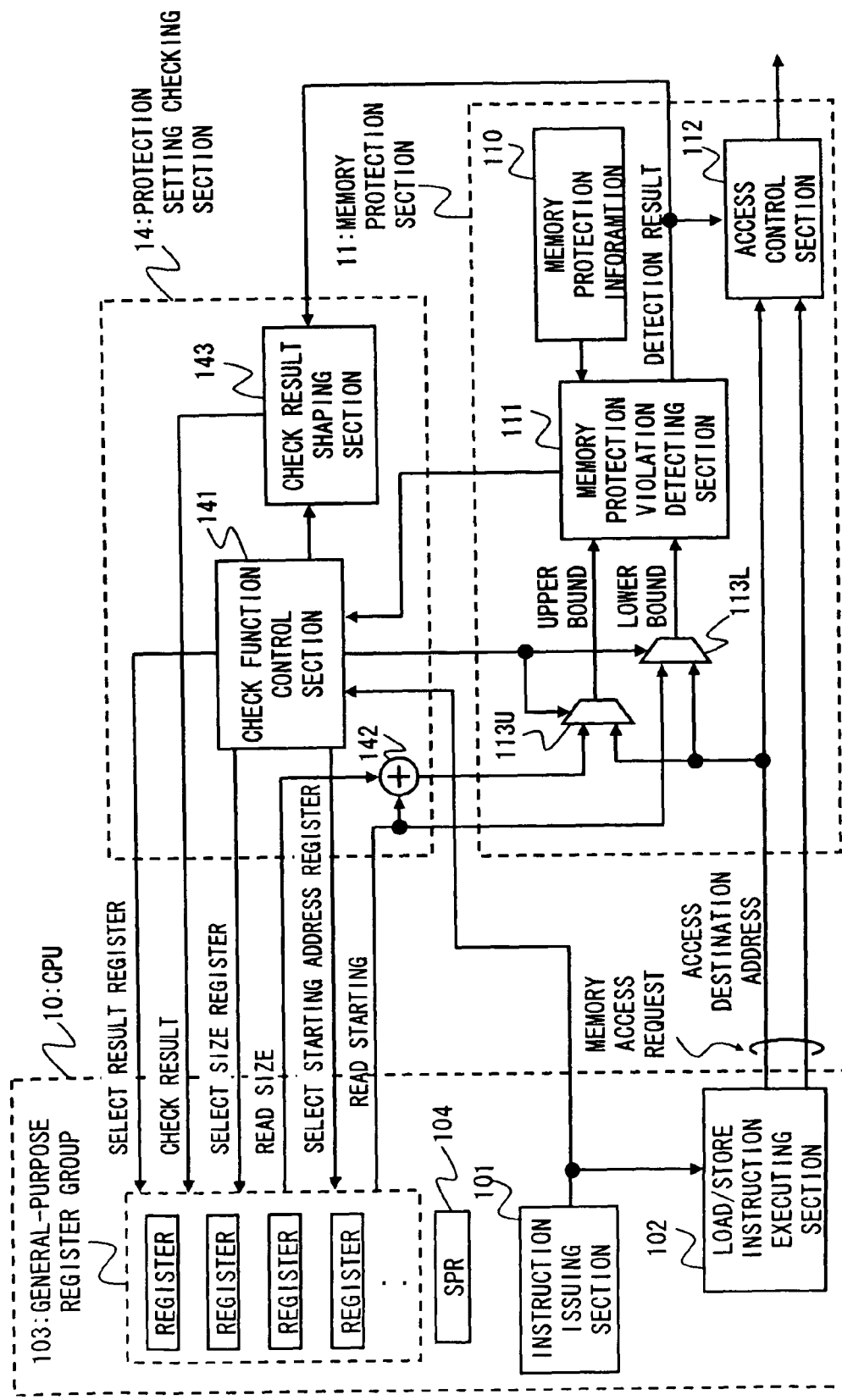
FIG. 7 is a diagram showing an example of a memory map including a stack area and also showing a configuration example of a memory protection information storage section.

FIG. 7 shows a configuration example for causing the protection setting checking section 14 to execute the check processing according to the dedicated instruction supplied from the CPU 10. Referring to FIG. 7, when the decoded instruction is the dedicated instruction for instructing the execution of the check processing, an instruction issuing section 101 included in the CPU 10 supplies the dedicated instruction to the check function control section 141. A load/store instruction executing section 102 executes access to the memory 13 based on a load instruction and a store instruction which are supplied from the instruction issuing section 101.

A general-purpose register group 103 is a register group that can be used for various purposes. For example, the general-purpose register group 103 can be used as an area for storing input data and output data of the load/store instruction executing section 102 and other instruction executing sections (not shown) such as an ALU, and also can be used as an area for storing a base address and an index value for use in a register indirect addressing mode. In the example shown in FIG. 7, the general-purpose register group 103 is used as an area for storing the starting address and the size of the area to be checked and storing the check results output from the protection setting checking section 14.

Upon receiving the dedicated instruction regarding the check request, the check function control section 141 shown in FIG. 7 references a general purpose register specified by the operand of the instruction, and reads the starting address and the size of the area to be checked from the general-purpose register group 103. Further, the check function control section 141 selects the result register specified by the operand of the dedicated instruction, and stores the shaped check results in the specified result register.

Figure 8:
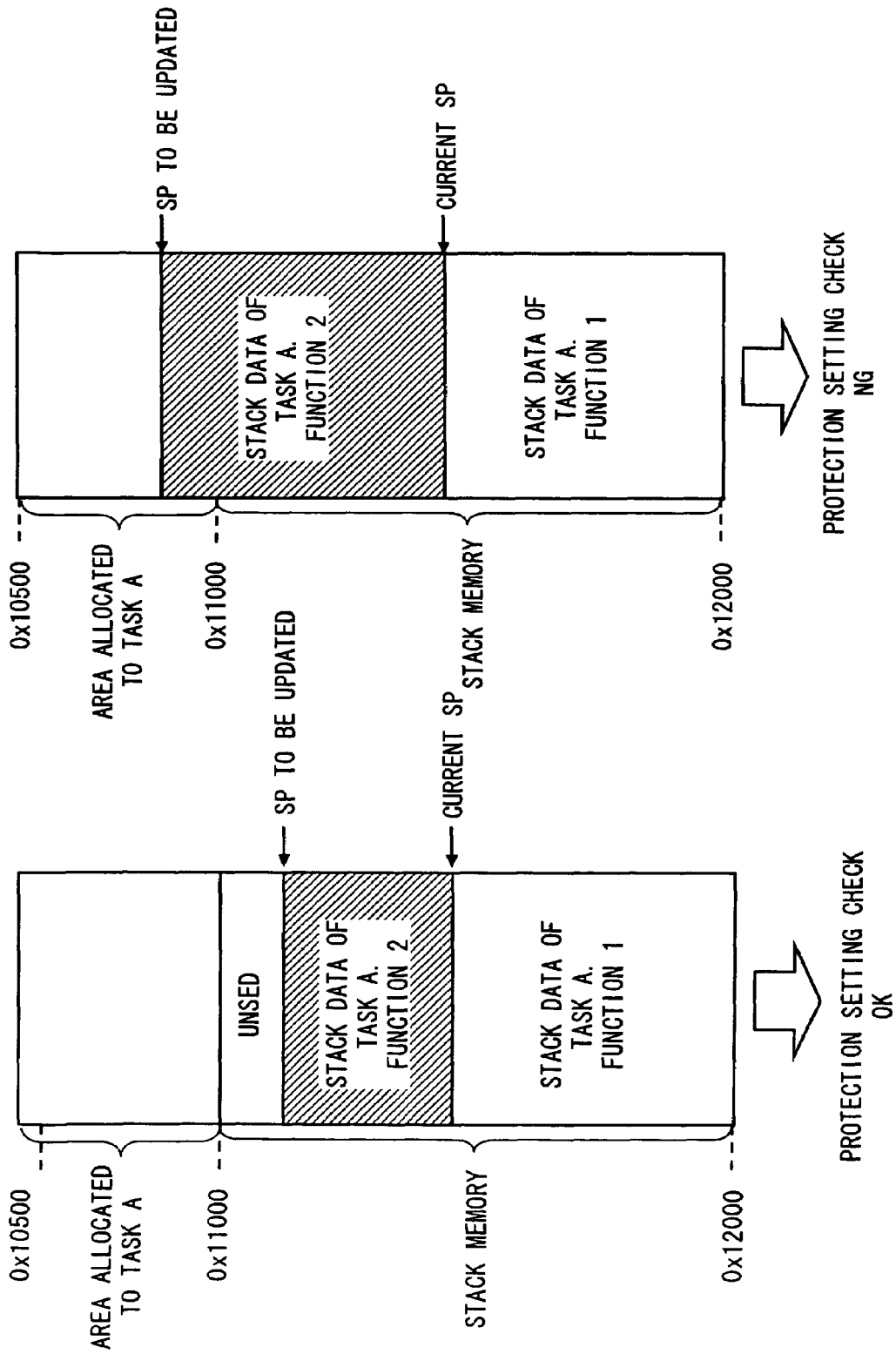
FIGS. 8A and 8B are diagrams for explaining a protection setting check operation executed by the information processing apparatus according to the first exemplary embodiment of the present invention.

FIGS. 8A and 8B each show a case where the stack extension is carried out by calling "task A. function 2" when a part of the stack area is occupied by stack data of "task A. function 1" in the memory map shown in FIG. 3A. According to the information processing apparatus 1, the protection setting checking section 14 outputs the check result indicating that the protection setting check is "normal" in the case of FIG. 8A, that is, in the case where the stack extension in the stack area can be performed and the stack overflow does not occur. This is because the detection result of the memory protection violation detecting section 111 indicates that the area is a stack reference permitted area, since the stack pointer (SP) to be updated is included in the stack area.

On the other hand, in the case of FIG. 8B, that is, in the case where the stack extension in the stack area cannot be performed, the protection setting checking section 14 outputs the check result indicating that the protection setting check is "abnormal". This is because the detection result of the memory protection violation detecting section 111 indicates that the area is not the stack reference permitted area, since the stack pointer (SP) to be updated is out of the stack area. Thus, the CPU 10 is capable of detecting the stack overflow in advance at the time of executing the stack extension prior to the execution of a stack operation instruction for instructing a push operation onto the stack. The CPU 10 having detected the stack overflow in advance is capable of causing the OS to secure a new stack area and to stop the execution of a task because of excess stack usage.

The detection of the stack overflow in advance avoids the generation of overheads due to complicated rollback processing required when the overflow occurs during the stack operation after the execution of the called function is started.

Further, according to an exemplary embodiment of the present invention, prior to the update of the stack pointer register (SPR) 104, the protection setting checking section 14 checks a current stack pointer (SP) value stored in the SPR 104 and the size of the stack to be extended, or an SP value which is obtained by adding those values and is to be updated, thereby detecting the stack overflow in advance. This is in contrast to the technology of Kimura et al. in which the stack overflow is detected by using the updated SP value when the SPR 104 is updated. According to the technology of Kimura et al., the stack operation (push operation) performed along with the update of the SPR may cause data destruction due to writing of data outside the stack area. This is because, in the case of updating the SPR, for example, it is necessary to save a previous stack pointer value stored in the SPR to the stack. On the other hand, the information processing apparatus 1 according to an exemplary embodiment of the present invention, which is capable of detecting the stack overflow in advance prior to the update of the SPR 104, can solve the problem with the technology of Kimura et al.

Further, when the stack area and other access-permitted areas are adjacent to each other as shown in FIG. 3A, the information processing apparatus 1 can solve the problem in that it is substantially difficult to detect the stack overflow by using the conventional method of detecting the access permission/denial when the memory access is actually made.

Further, the protection setting checking section 14 is capable of checking the area to be checked, by using the memory protection information as it is, which is already set in the memory protection information storage section 110 so as to detect the violation of the access request output from the CPU 10 that executes the task A. That is, processing of reading/writing new memory protection information is not particularly required when the checking of the area to be checked is carried out, thereby making it possible to perform the check processing more efficiently.

Furthermore, the protection setting checking section 14 according to an exemplary embodiment of the present invention does not include its own hardware for collating the address of the area to be checked, with the memory protection information. That is, according to the information processing apparatus 1, each of the collation circuits (first collation circuits) included in the memory protection violation detecting section 111, for collating the access destination address with the memory protection information, is also used as the hardware for collation (second collation circuit), which is to be included in the protection setting checking section 14, thereby simplifying the configuration.

Referring to FIG. 4, even when a plurality of access-permitted areas are set for the task A, the memory protection violation detecting section 111 including a plurality of collation circuits connected in parallel with each other enables collation of the plurality of access-permitted areas with the address of the area to be checked in parallel. That is, it is possible to suppress an increase in check time in proportion to an increase in the number of set access-permitted areas. Thus, according to the configuration shown in FIG. 4, that is, the configuration in which multiple pieces of hardware for collating the address of the area to be checked, with the memory protection information are connected in parallel with each other, the validity check can be executed more effectively at the time of calling a program.

In fact, to execute the memory protection with respect to the memory access request effectively, the collation circuits are connected in parallel with each other in many cases as shown in FIG. 4. Accordingly, as described in an exemplary embodiment of the present invention, the configuration in which each of the collation circuits included in the memory protection violation detecting section 111 is also used as the hardware for collating the address of the area to be checked, with the memory protection information is effective for both the simplification of the configuration and enhancement in efficiency of address check.

Note that the example where the processing is transferred to the OS at the time of calling the function included in the same task is described above so as to explain the operation of the CPU 10 at the time of calling the function (see FIG. 2). However, this is merely an example of the concepts for explaining the operation executed at the time of calling the function. That is, in the case of calling the function included in the same task, the CPU 10 may directly branch to the called function without transferring the processing to the OS.

Figure 9:
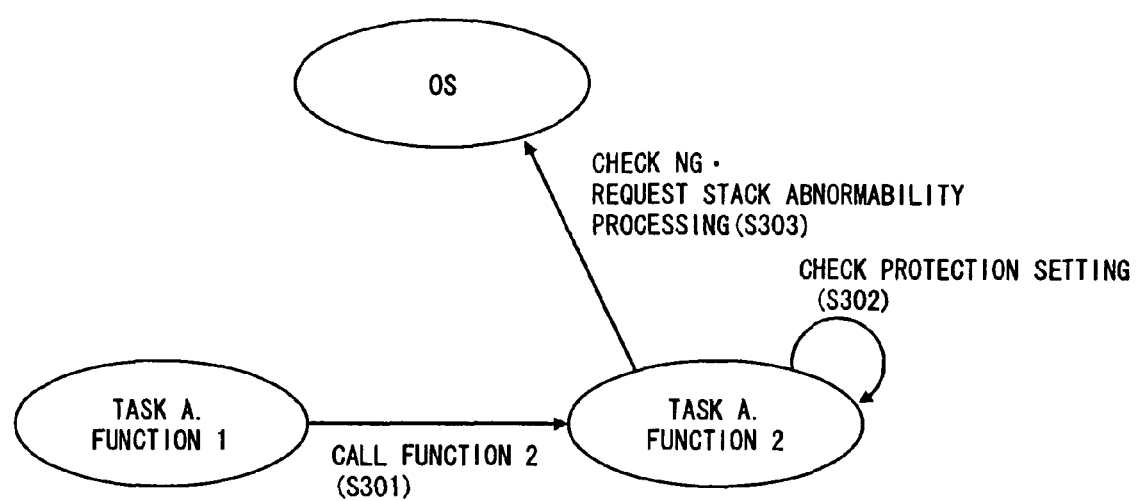
FIG. 9 is a conceptual diagram for explaining a function call operation performed in the information processing apparatus according to the first exemplary embodiment of the present invention.

FIG. 9 is a conceptual diagram for explaining the operation of the CPU 10 which is configured to branch directly to the called function at the time of calling the function included in the same task. When the CPU 10 calls the function 2 while executing the function 1 included in the task A, the CPU 10 branches to entry processing for the function 2 (S301). In the entry processing for the function 2, a check request is issued to the protection setting checking section 14 (S302). In the entry processing for the function 2, when confirming that the address of the area to be checked is included in the stack area, the CPU 10 overwrites the stack pointer value obtained after the stack extension. When confirming that the address of the area to be checked is not included in the stack area, the CPU 10 issues a system call for requesting the OS to deal with stack failure (S303). The entry processing may be carried out such that a sequence of instructions is generated by a complier in the entry processing for each function, in the same manner as in the case of a sequence of instructions conventionally generated by a complier, for updating the stack pointer in the entry processing for each function.

Second Exemplary Embodiment

An information processing apparatus 2 according to another embodiment of the present invention is characterized by having a function of executing memory access control according to whether or not memory access by a CPU corresponds to stack pointer relative access (hereinafter, referred to as "SP relative access"), in addition to the configuration and functions of the information processing apparatus 1.

Figure 10:
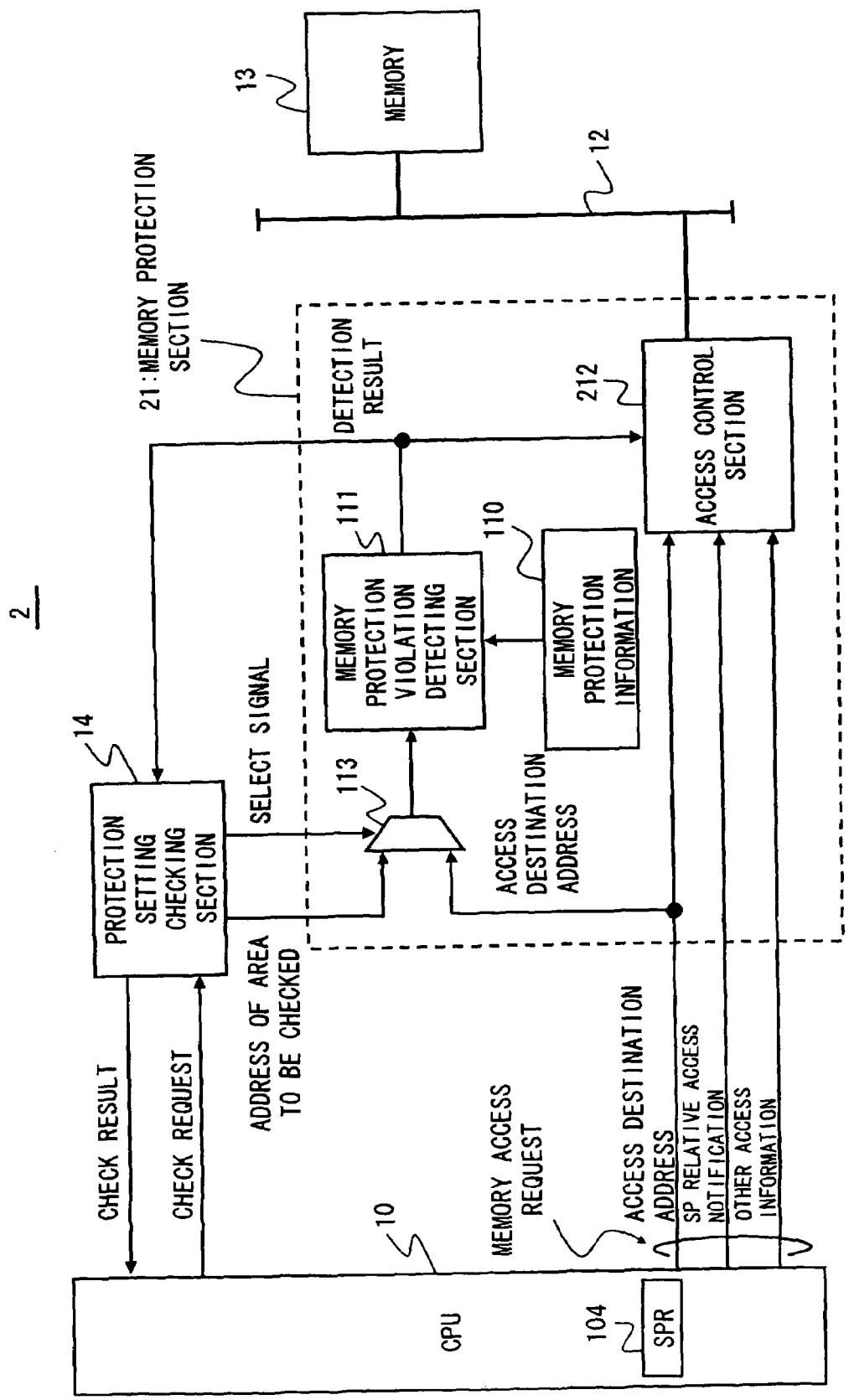
FIG. 10 is a block diagram showing the configuration of an information processing apparatus according to a second exemplary embodiment of the present invention.

FIG. 10 is a block diagram showing the configuration of a main part of the information processing apparatus 2. A CPU 20 and an access control section 212 included in a memory protection section 21 of the information processing apparatus 2 are different from those of the information processing apparatus 1.

The CPU 20 is different from the CPU 10 in that an SP relative access notification indicating whether or not the memory access corresponds to the SP relative access is included in the memory access request and is output. The term "SP relative access" refers to memory access generated when an access destination address is generated using the SPR 104 as a base register.

The access control section 212 receives the detection result of the memory protection violation detecting section 111, which indicates the permission/denial of stack reference, and detects access to an area where stack reference is not permitted, that is, a non-stack area. Then, the access control section 212 interrupts the access when the CPU 20 executes the SP relative access to the non-stack area, and generates a protection exception.

Note that, though FIG. 4 shows the configuration in which the detection result indicating whether the permission/denial of stack reference is not supplied to the access control section 112, according to an exemplary embodiment of the present invention, the detection result of the memory protection violation detecting section 111, which indicates the permission/denial of stack reference, may be supplied to the access control section 212.

Figure 11A:
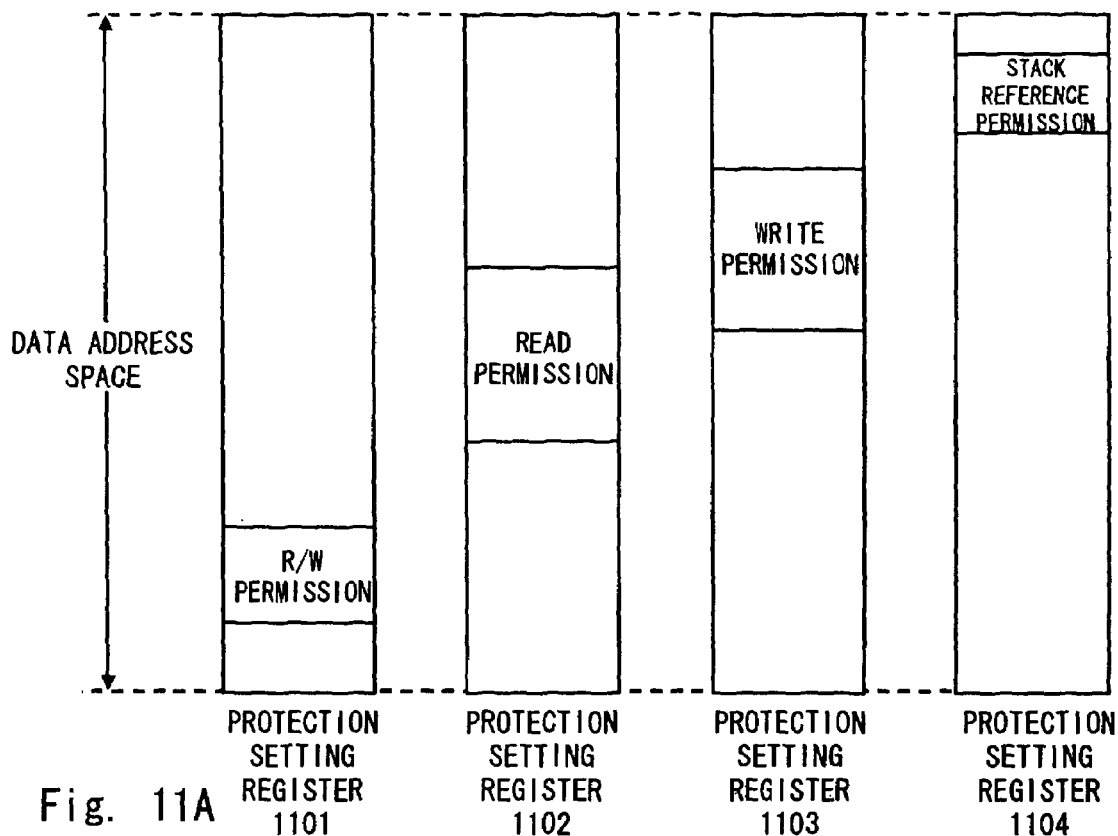
FIGS. 11A and 11B are diagrams for explaining a protection setting check operation performed by the information processing apparatus according to the second exemplary embodiment of the present invention.

For example, referring to FIG. 11A, consideration is given to a case where an access-permitted area for a certain task (task A) is set by four protection setting registers 1101 to 1104. Specifically, each of the four protection setting registers 1101 to 1104 indicates the non-stack area. Specifically, the access-permitted area specified by the protection setting register 1101 corresponds to an R/W-permitted area where both read access and write access are permitted. Further, the access-permitted area specified by the protection setting register 1102 corresponds to a read-permitted area where only the read access is permitted. Furthermore, the access-permitted area specified by the protection setting register 1103 corresponds to a write-permitted area where only the write access is permitted.

On the other hand, the protection setting register 1104 specifies an area where the stack reference can be made, that is, a stack area. The stack area corresponds to the R/W-permitted area.

Figure 11B:
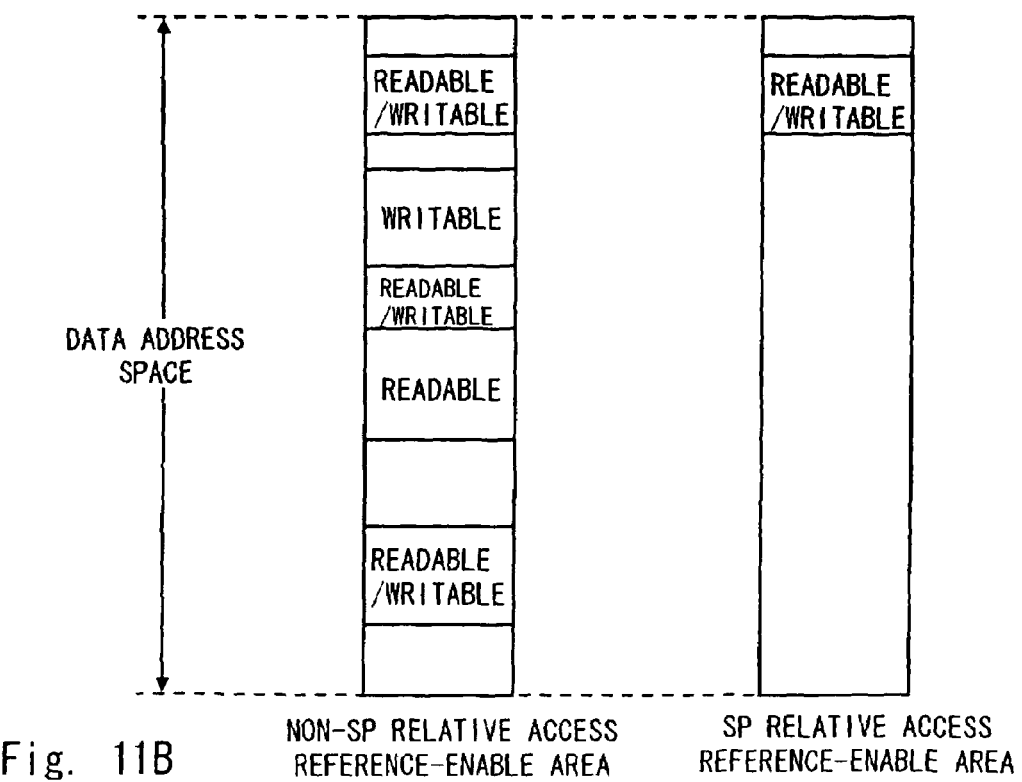

FIG. 11B is a memory map showing areas accessible from the CPU 20 when the access control section 212 executes memory access control based on the memory protection information shown in FIG. 11A. The left side of FIG. 11B shows memory areas accessible from the CPU 20 by executing non-SP relative access, which is access other than the SP relative access. In this case, the CPU 20 can access all the access-permitted areas. The right side of FIG. 11B shows memory areas accessible from the CPU 20 by executing the SP relative access. In this case, the accessible areas are limited to the stack area where the stack reference is permitted.

As described above, in the information processing apparatus 2, the CPU 20 notifies the memory protection section 21 of the stack relative access, and the memory protection section 21 inhibits the stack relative access to the non-stack area.

For example, in a program written in C language, a local variable and an argument of a function are stored in the stack area. Since those variables can be referenced through a pointer, the variables stored in the stack are not always referenced by the SP relative access. However, the SP relative access to an accessible area other than the stack area is not made.

When the SP relative access to the non-stack area is made by mistake due to an authorized value set to the stack pointer, the information processing apparatus 2 detects the protection violation, thereby preventing unauthorized data manipulation. Thus, the information processing apparatus 2 can provide more robust memory protection.

Third Exemplary Embodiment

According to the first and second exemplary embodiments of the present invention, while hardware for collating the address of the area to be checked, with the memory protection information, is not provided to the protection setting checking section 14, the hardware of the memory protection violation detecting section 111 or a peripheral device protection violation detecting section is also used as the hardware for collating the address of the area to be checked, with the memory protection information. Alternatively, though the configuration is redundant, the hardware for collating the address of the area to be checked, with the memory protection information may be provided to the protection setting checking section 14.

Figure 12:
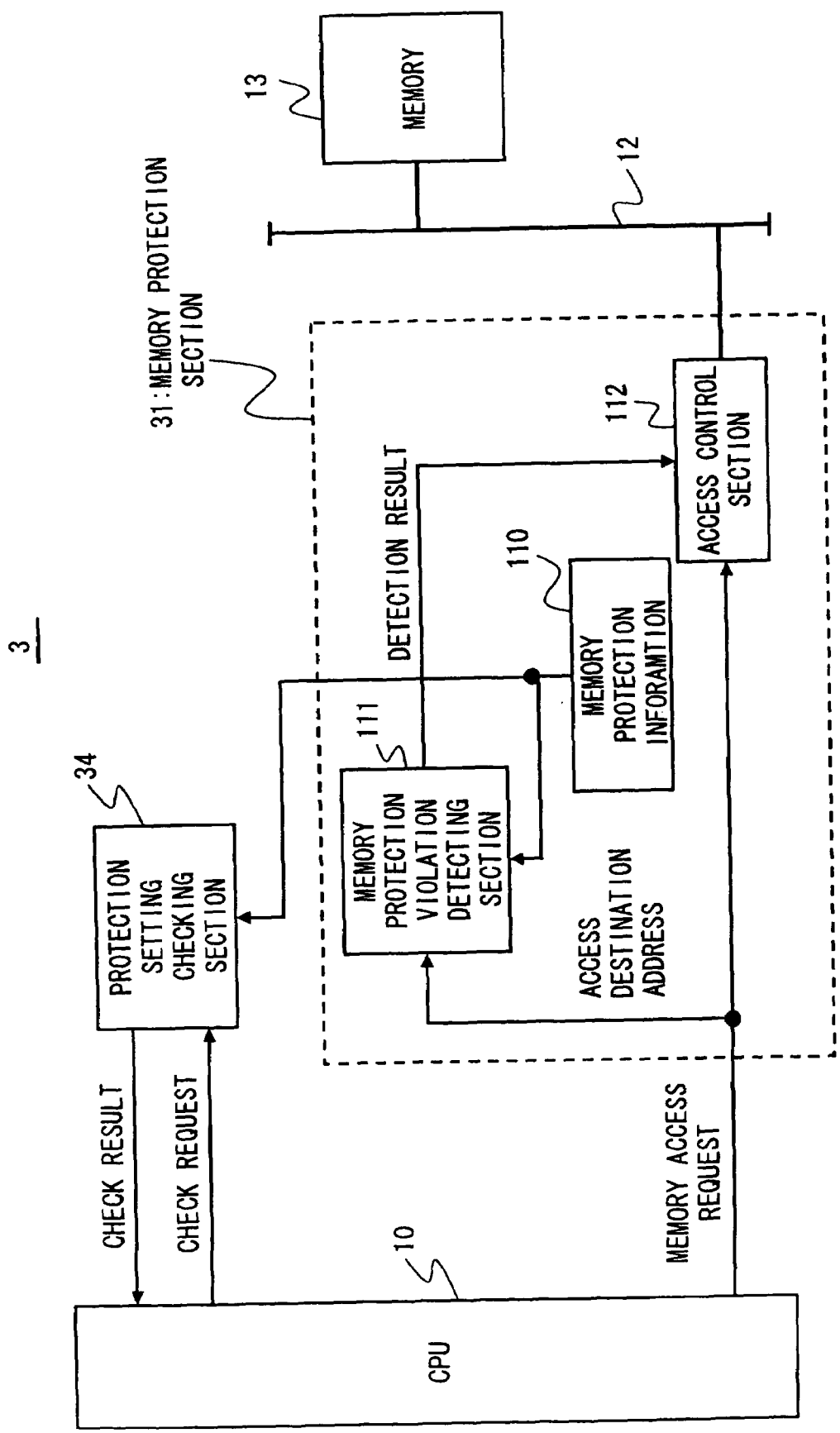
FIG. 12 is a block diagram showing the configuration of an information processing apparatus according to a third exemplary embodiment of the present invention.
Figure 13:
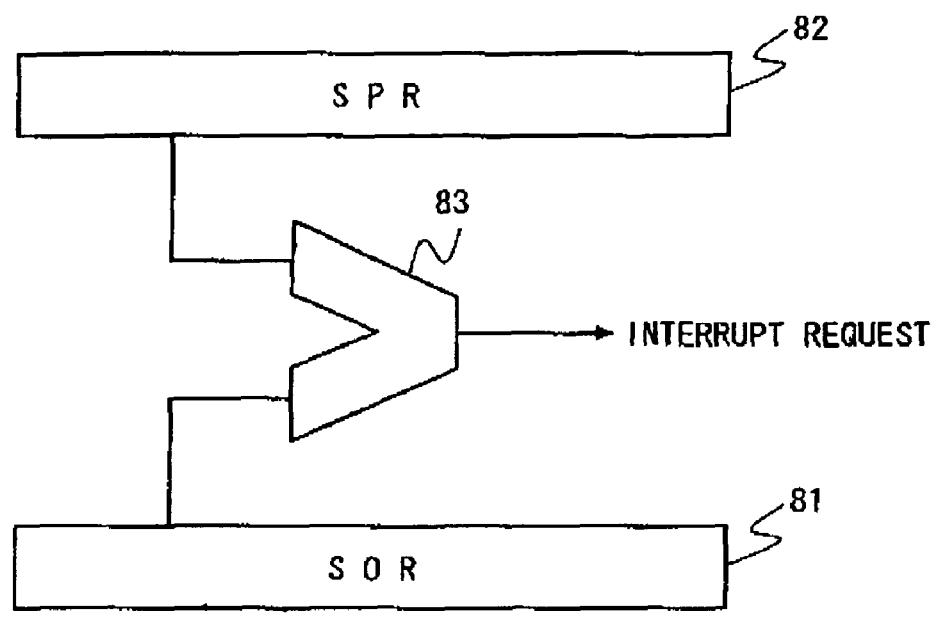
FIG. 13 is an explanatory diagram of a technology disclosed in Toride.

FIG. 12 shows the configuration of an information processing apparatus 3 according to a still another exemplary embodiment of the present invention. Referring to FIG. 12, similar to the embodiment illustrated in FIG. 1, the information processing apparatus 3 includes memory protection section 31 as well as a protection setting checking section 34 is obtained by adding hardware for collating the address of the area to be checked, with the memory protection information or peripheral device protection information, to the protection setting checking section 14 included in the information processing apparatus 1 according to the first exemplary embodiment of the present invention. Note that the hardware for collation, which is added to the protection setting checking section 34, may have the same configuration as that of the collation circuit of the memory protection violation detecting section 111 shown in FIG. 5.

Note that the information processing apparatuses 1 to 3 according to the first to third exemplary embodiments of the present invention each may be configured as a microcomputer formed on a single chip, or may be implemented as a computer system including a plurality of chips.

Further, the present invention is not limited to the exemplary embodiments described above, and various modifications can be made without departing from the gist of the present invention.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An information processing device, comprising:
an instruction execution part that outputs a normal access request, the normal access request including first address information to specify an access destination based on an execution of an access command of an address space in a memory not including a stack operation instruction to a stack area included in the address space, and that outputs a check request including second address information to specify a stack pointer point after an extension based on an execution of a stack extension command to extend the stack area by updating the stack pointer point;
a memory protection information storage section that stores memory protection information to define a plurality of partial spaces from the address space, the partial spaces being accessible by the instruction execution part;
a protection violation detection section that detects whether the access destination includes the plurality of the partial spaces, by collating the first address information with the memory protection information stored in the memory protection information storage section, in a response to the normal access request; and
a checking section that checks whether the stack pointer point includes a predetermined partial space for a stack among the plurality of the partial spaces, by collating the second address information with the memory protection information stored in the memory protection information storage unit, in a response to the check request, the predetermined partial space being retained preliminarily as a stack area enabling the stack,
wherein the memory protection information is configured as a plurality of protection setting registers, each one the plurality of protection setting registers specifying a single access-permitted area comprising a lower bound address and an upper hound address as a stack area, and a stack reference assignment section indicating whether the stack area is access-permitted, said protection setting registers being configured in a single protection setting register in the memory protection information storage section, and wherein the instruction execution part outputs the stack operation instruction with an updated stack pointer as the first address information based on an execution of the stack operation instruction, when the checking section determines that the stack pointer point is not in a stack reference access-permitted area.

2. The information processing device according to claim 1, wherein the protection violation detection section includes a first collating circuit, the checking section includes a second collating circuit, the first collating circuit collates the memory protection information with the first address information, the second collating circuit collates the memory protection information with the second address information, and the first collating circuit and the second collating circuit are formed as a hardware independent from the instruction execution part.

3. The information processing device according to claim 2, further comprising a selector circuit that supplies the first address information or the second address information included in the normal access request selectively to the protection violation detection section, wherein the second collating circuit is used also as the first collating circuit.

4. The information processing device according to claim 1, further comprising a stack pointer register that stores a current stack pointer value, wherein, by using having checked that an updated stack pointer value is included in the stack area by the checking section as a cue, the stack pointer register stores the updated stack pointer value to complete an extension of the stack.

5. The information processing device according to claim 1, further comprising:

a stack pointer register that stores a current stack pointer value; and an access control section that controls whether to permit an access to the memory based on the normal access request according to the detection result of the protection violation detection section, wherein the instruction execution part supplies a SP (stack pointer) relative access information and the normal access request to the protection violation detection section by using a stack pointer value stored in the stack pointer register, the SP relative access information indicating whether the first address information has been generated, and wherein the access control section bans an access by the normal access request including the SP relative access information to a non-stack area based on a detecting result of the protection violation detection section.

6. The information processing device according to claim 1, wherein the first address information is specified by one of a single address, a combination of a base address and a size of data required to be transferred, and a combination of a lower bound address and an upper bound address of a location where the data required to be transferred is stored.

7. The information processing device according to claim 1, wherein the each one of the plurality of protection setting registers further comprises one of a combination of a starting address and an area size and a starting address and a number of low-order bits to be masked.

8. The information processing device according to claim 7, wherein the starting address comprises one of a lower bound address and an upper bound address.

9. The information processing device according to claim 1, wherein the memory comprises at least one of a random access memory (RAM), a read only memory (ROM), and a flash memory.

10. The information processing device according to claim 1, wherein the protection setting register further comprises a permission type, the permission type comprising at least one of a write access, a read access, and an instruction fetch access.

11. The information processing device according to claim 1, further comprising a storage area storing a flag indicating a validity/invalidity of each of the plurality of protection setting registers.

12. The information processing device according to claim 11, wherein the stack reference assignment section indicates whether a respective storage area corresponds to the stack area.

13. The information processing device according to claim 1, wherein the protection violation detection section detects whether the access destination includes the plurality of the partial spaces in response to the normal access request and to the stack operation instruction with the updated stack pointer.

14. A method of updating a stack pointer of an information processing device including an instruction executing part and a memory protection information storage section storing a memory protection information to specify a plurality of partial spaces which enable an access by the instruction executing part from an address space, the method comprising:

outputting an access request including first address information to specify an access destination by the instruction executing part corresponding to an execution of a normal access request to the address space not including a stack operation instruction to a stack area included in the address space;

detecting whether the access destination is included in the plurality of the partial spaces, by collating the first address information with the memory protection information stored in the memory protection information storage section, in a response to the normal access request;

outputting a check request including second address information to specify a stack pointer point after extension corresponding to an execution of a stack extension request to extend the stack area, by updating the stack pointer point; and checking whether the stack pointer point is included in a predetermined partial space for a stack among the plurality of the partial spaces, by collating the second address information with the memory protection information stored in the memory protection information storage section, in a response to the check request, the predetermined partial space being retained preliminarily as a stack area enabling the stack, wherein the memory protection information is configured as a plurality of protection setting registers, each one of the plurality of protection setting registers specifying a single access-permitted area comprising a lower bound address and an upper bound address as a stack area, and a stack reference assignment section indicating whether the stack area is access-permitted, said protection setting registers being configured in a single protection setting register in the memory protection information storage section, and wherein the instruction execution part outputs the stack operation instruction with an updated stack pointer as the first address information based on an execution of the stack operation instruction, when the checking section determines that the stack pointer point is not in a stack reference access-permitted area.

15. The method of updating a stack pointer according to claim 14, further comprising storing an updated stack pointer value to a stack pointer register storing a current stack pointer value, in order to complete an extension of the stack, by having checked that an updated stack pointer value is included in the stack area by the checking as a cue.

* * * * *